L. L. ARNOLD.
AXLE LUBRICATOR.
APPLICATION FILED FEB. 25, 1909.
949,670.
Patented Feb. 15, 1910.
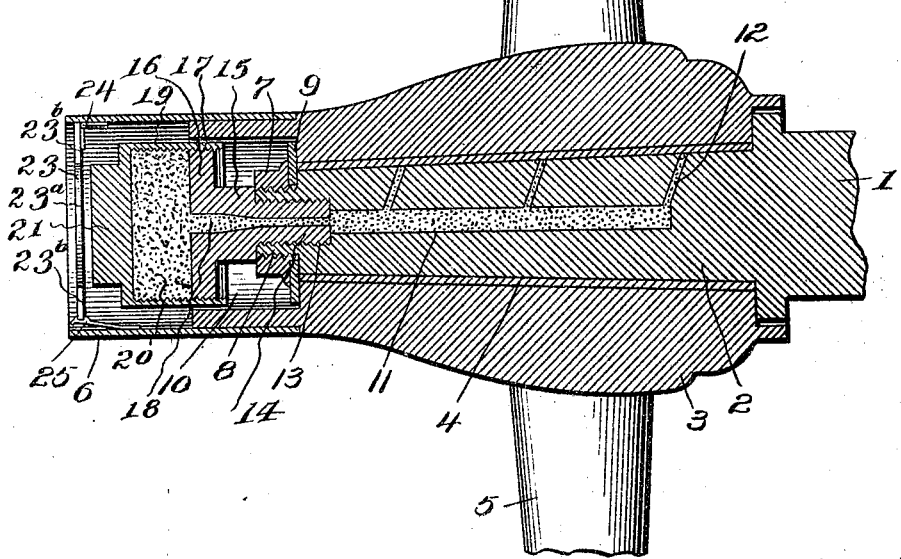
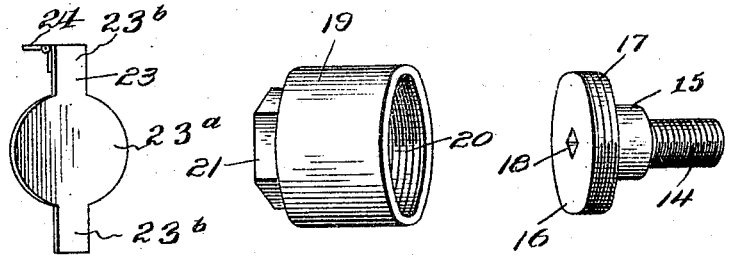
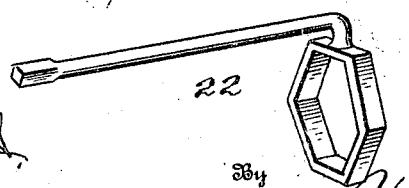
Inventor
Lloyd L. Arnold

UNITED STATES PATENT OFFICE.

LLOYD L. ARNOLD, OF NORTH TAZEWELL, VIRGINIA.

AXLE-LUBRICATOR.

949,670.  Specification of Letters Patent.  Patented Feb. 15, 1910.

Application filed February 25, 1909. Serial No. 479,897.

*To all whom it may concern:*

Be it known that I, LLOYD L. ARNOLD, a citizen of the United States, residing at North Tazewell, in the county of Tazewell and State of Virginia, have invented new and useful Improvements in Axle-Lubricators, of which the following is a specification.

My invention relates to improvements in axle lubricators, and its primary object is the provision of a device of this character in the use of which the spindle of a vehicle axle can be lubricated without removing the wheel therefrom, the invention comprehending a lubricator which is simple, durable and efficient, and which may be manufactured and sold at a comparatively low cost.

With the above and other objects in view, the invention consists in the construction, combination and arrangement of parts hereinafter fully described and claimed, and illustrated in the accompanying drawing, wherein:

Figure 1 is a sectional view taken on a plane extending vertically and centrally through a spindle equipped with a lubricator constructed in accordance with my invention, the guard being shown in side elevation. Fig. 2 is a detail perspective view of the means by which the cup of the lubricator is secured against loss. Fig. 3 is a detail perspective view of the cup of the lubricator. Fig. 4 is a detail perspective view of the head of the lubricator, and Fig. 5 is a detail perspective view of the wrench by means of which the cup may be applied or removed from or turned upon the head.

Referring to the drawing by reference numerals, 1 designates a vehicle axle and 2 the spindle thereof.

3 designates the hub, 4 the axle box, and 5 the spokes of a wheel of the usual form and construction, the wheel also comprising a hub cap 6. The wheel is secured in applied position by means of a nut 7 which is mounted upon the threaded extension 8 of the spindle 2, and by means of a washer 9 which is interposed between the nut and the adjacent end of the hub. The hub is recessed as at 10 to receive the nut 7 and washer 9 and also to receive a portion of and to permit the operation of the lubricator.

The spindle is provided with a centrally located and longitudinally extending channel 11 which communicates at its outer end with a threaded socket 13, the socket opening out through the end of the threaded extension 8 of the spindle. Communication between the channel 11 and the upper side of the spindle 2 is established through the medium of a plurality of upwardly and inwardly inclined ducts 12.

The lubricator comprises a circular head 16 having its edge screw-threaded as at 17. The lubricator also comprises a cylindrical cup 19 which is closed at one end and fully open at its other end. The inner surface of the annular wall of the cup 19 is screw-threaded as at 20 to permit the cup to be movably mounted upon the head 16. Extending from one side of the head 16 is a cylindrical stud 15 having a reduced threaded extension 14. The extension 14 is threaded into the socket 13 to secure the lubricator in applied position. The stud 15 has a diameter greater than that of the extension 8 of the spindle 2 whereby to permit it to act as a lock for the nut 7, that is to say, the stud 15 prevents the nut 7 from accidentally turning off of the extension 8 of the spindle 2. A passage 18 extends through the head 16, the stud 15 and the extension 14, whereby to establish communication between the lubricator and the channel 11. The outer closed end of the cup 19 is provided with an angular enlargement 21, such enlargement permitting the cup to be adjusted upon the head 16 through the medium of a wrench 22, shown in detail in Fig. 5 of the drawing.

In practice the lubricant is placed in the cup 19, after which the cup is applied to the head 16. The cup 19 is then turned upon the head to force the lubricant into the channel 11, the lubricant passing through the channel to the upper side of the spindle 2 through the ducts 12. When the lubricant which was forced upon the upper side of the spindle 2 by the initial turning of the cup 19 upon the head 16 is exhausted, the spindle may be again lubricated by turning the cup farther upon the head. It should be thus apparent that the spindle may be readily and quickly lubricated without removing the wheel therefrom.

To prevent the cup 19 from being lost should it by accident become displaced from the head 16, a guard 23 is secured to the inner side of the hub cap 6. The guard 23 comprises a circular body 23$^a$ and laterally extending diametrically opposed arms 23$^b$. The guard 23 is secured in applied position by means of a hinge 24, one leaf of the hinge being secured to one of the arms 23ᵇ and the other leaf thereof is secured to the inner side of the hub cap 6. The other arm 23ᵇ of the guard 23 is adapted to be engaged by a spring catch 25 which is secured to the inner side of the hub cap 6. The catch 25 holds the guard 23 against movement and it may be readily and quickly thrown out of engagement with the guard when it is desired to move the guard aside to obtain access to the cup 19.

While I have described the method of operation of the invention, together with the apparatus which I now consider to be the best embodiment thereof, I desire to have it understood that the apparatus shown is merely illustrative and that such changes may be made when desired as are within the scope of the claims.

Having now described the invention, what is claimed as new is:—

1. An axle having the spindle thereof provided with a threaded extension and a channel extending centrally and longitudinally thereof, said channel communicating at its outer end with a threaded socket extending through the extension in the spindle, said channel communicating with the upper side of the spindle through the medium of ducts, a wheel mounted upon the spindle, a nut mounted upon the threaded extension of the spindle and securing the wheel in applied position, a circular head provided with a cylindrical stud having a reduced threaded extension, said extension engaging in the socket, the diameter of the stud being greater than that of the spindle extension whereby to cause the stud to form a lock for the nut, and a cylindrical cup fully closed at one end adjustably mounted upon the head, communication between the channel and cup being established through the medium of a passage extending through the head and the stud and its extension.

2. An axle having the spindle thereof provided with a channel and with ducts extending from the channel to the upper side of the spindle, a wheel mounted upon the spindle, a hub cap secured to the wheel, a lubricator secured to the spindle, a guard consisting of a circular body and laterally extending arms, a hinge having one leaf secured to one of the arms of the guard and its other leaf secured to the inner side of the hub cap, and a spring catch secured to the inner side of the hub cap and adapted to engage the other arm of the guard.

In testimony whereof I affix my signature in presence of two witnesses.

LLOYD L. ARNOLD.

Witnesses:
W. T. GILLESPIE,
GRAT M. MULLIN.